(12) United States Patent
Fuchs et al.

(10) Patent No.: US 12,288,047 B2
(45) Date of Patent: Apr. 29, 2025

(54) EXTENSIBLE BINDING MECHANISM FOR TRANSLATING BETWEEN APPLICATION PROGRAMMING INTERFACE DESCRIPTION LANGUAGES

(71) Applicant: Salesforce, Inc., San Francisco, CA (US)

(72) Inventors: Matthew Daniel Fuchs, Los Gatos, CA (US); Antonio Garrote, San Francisco, CA (US); Kelly Henvy, San Francisco, CA (US); Pawel Uchida-Psztyc, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 40 days.

(21) Appl. No.: 17/877,756

(22) Filed: Jul. 29, 2022

(65) Prior Publication Data

US 2024/0036831 A1 Feb. 1, 2024

(51) Int. Cl.
*G06F 8/35* (2018.01)
*G06F 8/30* (2018.01)
*G06F 8/34* (2018.01)
*G06F 8/41* (2018.01)

(52) U.S. Cl.
CPC .................. *G06F 8/35* (2013.01); *G06F 8/31* (2013.01); *G06F 8/34* (2013.01); *G06F 8/433* (2013.01)

(58) Field of Classification Search
CPC ..... G06F 8/31; G06F 8/34; G06F 8/35; G06F 8/433
See application file for complete search history.

(56) References Cited

U.S. PATENT DOCUMENTS

| | | | | |
|---|---|---|---|---|
| 7,681,119 B2* | 3/2010 | Fong | ..................... | G06F 16/289 |
| | | | | 715/239 |
| 8,392,151 B1* | 3/2013 | Grace | ..................... | G06T 19/00 |
| | | | | 703/22 |
| 2009/0265684 A1* | 10/2009 | Fuchs | ....................... | G06F 8/34 |
| | | | | 717/105 |

(Continued)

OTHER PUBLICATIONS

Alexander Senger et al., "API Modeling and Description Languages," 2019 [retrieved on Dec. 9, 2024], Seminar Web ENgineering WS 2018/2019, pp. 1-13, downloaded from <url>:https://agrawalshyam.com/reports/Seminar_Web_Engineering_API_Modelling.pdf. (Year: 2019).*

(Continued)

*Primary Examiner* — S. Sough
*Assistant Examiner* — Stephen D Berman
(74) *Attorney, Agent, or Firm* — Sterne, Kessler, Goldstein & Fox P.L.L.C.

(57) ABSTRACT

A system allows translation across API models represented using different API description languages. The system stores model bindings from a common visualization model format to multiple API description languages. The model bindings map constructs of the API description language to and from modeling constructs of the common visualization model format. The system uses the model bindings to convert API models to and from representations based on API description languages to the common visualization model format. The system used the common visualization model format to generate visualizations of the API model that can be displayed via a user interface and also allow users to modify the API model.

14 Claims, 6 Drawing Sheets

(56) References Cited

U.S. PATENT DOCUMENTS

| | | | | |
|---|---|---|---|---|
| 2010/0325605 | A1* | 12/2010 | Ding | G06Q 10/10 |
| | | | | 717/105 |
| 2012/0042299 | A1* | 2/2012 | Perrin | G06F 8/10 |
| | | | | 717/104 |
| 2016/0004516 | A1* | 1/2016 | Ivanov | G06F 8/34 |
| | | | | 717/106 |
| 2018/0081645 | A1* | 3/2018 | Alurralde Iturri | G06F 8/38 |

OTHER PUBLICATIONS

Embarcadero, Inc., "Importing and Exporting UML Models," Jan. 4, 2016, 2 pages, [Online] [Retrieved on Jul. 12, 2023] Retrieved from the Internet URL: <https://docwiki.embarcadero.com/RADStudio/Alexandria/en/Importing_and_Exporting_UML_Models>.

IBM, "Importing and exporting UML models," Mar. 5, 2021, 2 pages, [Online] [Retrieved on Jul. 12, 2023] Retrieved from the Internet URL: <https://www.ibm.com/docs/en/rsar/9.5?topic=diagrams-importing-exporting-uml-models>.

Sparx Systems, "Import ArchiMate Model Exchange File," Oct. 20, 2018, 2 pages, [Online] [Retrieved on Jul. 12, 2023] Retrieved from the Internet URL: <https://sparxsystems.com/enterprise_architect_user_guide/14.0/model_domains/imparchmeff.html>.

UML, "UML Package Import," Nov. 4, 2017, 1 page, [Online] [Retrieved on Jul. 12, 2023] Retrieved from the Internet URL: <https://www.uml-diagrams.org/package-import.html>.

Visual Paradigm, "How to Import/Export ArchiMate Model Exchange File?" Sep. 14, 2017, 4 pages, [Online] [Retrieved on Jul. 12, 2023] Retrieved from the Internet URL: <https://www.visual-paradigm.com/support/documents/vpuserguide/4455/4409/86476_importexport.html>.

* cited by examiner

400

Storing model bindings from common visualization model format to an API description language
410

↓

Receiving an API model specified using the API description language
420

↓

Converting the API model based on the API description language to a representation using the common visualization model format
430

↓

Receiving a modification to the API model based on the common visualization model format
440

↓

Converting the API model representation using the common visualization model format to an API model using he API description language
450

FIG. 4

EXTENSIBLE BINDING MECHANISM FOR TRANSLATING BETWEEN APPLICATION PROGRAMMING INTERFACE DESCRIPTION LANGUAGES

BACKGROUND

Field of Art

This disclosure relates in general to modeling of software systems, and in modeling and visualization of software systems using application programming interface (API) description languages.

Description of the Related Art

Software programs have become large and highly complex. As a result, it is difficult for software engineers to review and analyze typical software programs. Software engineers use various tools for modeling such software systems. Modeling of software systems allows high-level representation of processes and objects that define the structure and behavior of programs. Furthermore, modeling tools allow the model representation of a software program to be visualized. Conventional modeling tools support a specific format for modeling systems or a particular API description language. However, several API description languages are available, for example, UML (unified modeling language), RAML (restful API modeling language), GraphQL (Graph query language), and so on. Each API description language typically supports a specific set of features. Therefore, a modeling tool based on a particular API description language is not able to represent models specified using other API description languages.

BRIEF DESCRIPTION OF DRAWINGS

FIG. 4 is a flow chart illustrating the overall process of translating API models across API description languages using a common visualization model format, according to an embodiment.

Figure 1A:
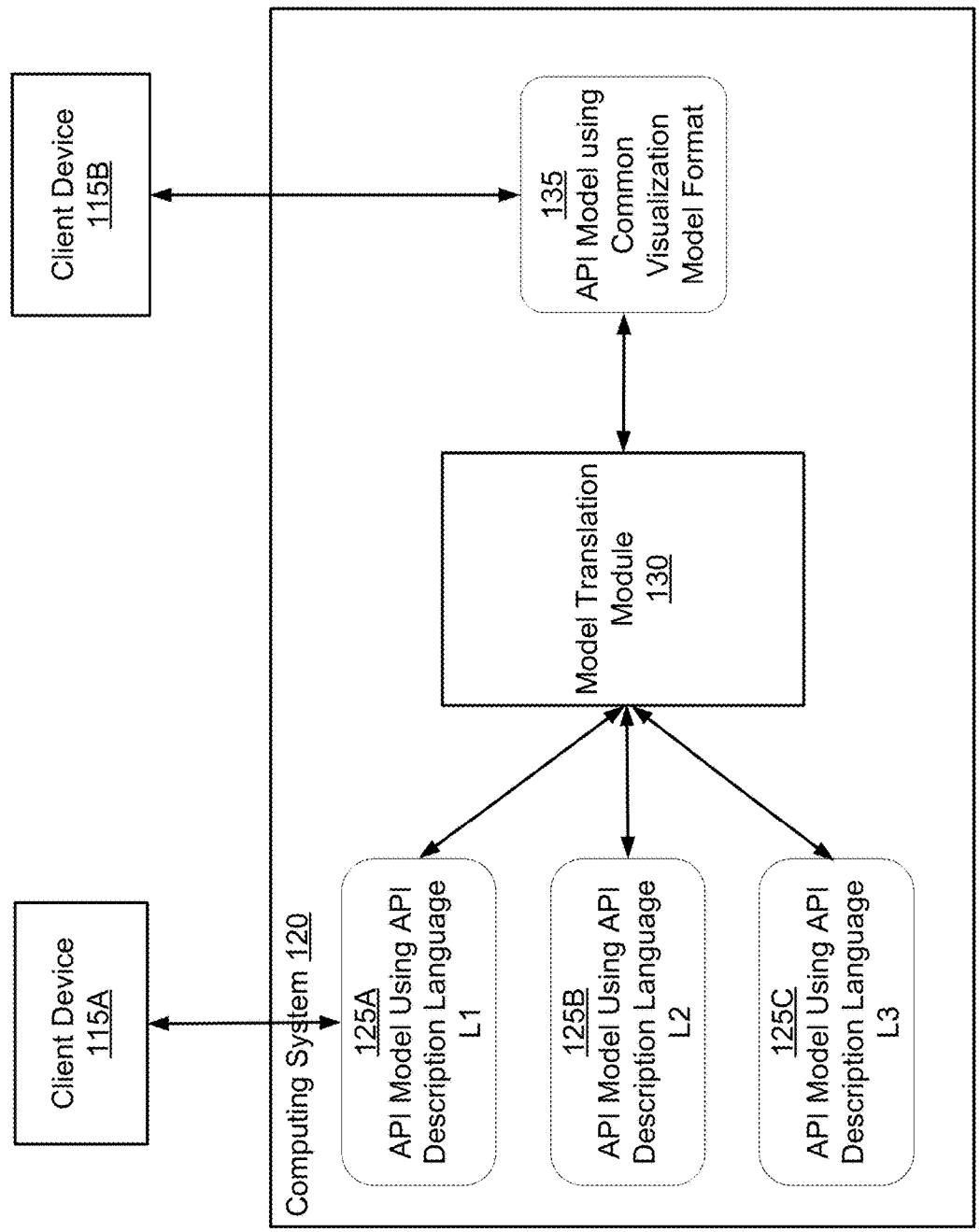
FIG. 1A is a block diagram of a system environment for using a common visualization model format for modeling API schemas, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A system according to an embodiment represents models of software systems using a common visualization model format. The system supports models based on multiple API description languages, for example, UML (unified modeling language), RAML (restful API modeling language), GraphQL (Graph query language), SQL (structured query language), OAS (OpenAPI Specification), AsyncAPI specification, and so on. The system allows the common visualization model format to be extended using model bindings to support features of specific API description languages. This allows a single visualization tool based on the common visualization model format to be able to visualize multiple API description languages based on different formats. Each API description language could include features that are different from the other API description languages and also different from the common visualization model format. This allows users to extend the common visualization model format for a particular API description language and also visualize the API description language including the additional and/or different features.

An example of models of software systems is API model. An API model specifies a set of APIs supported by a system, a service, or an application. An API of the set of APIs represents an action that can be performed by invoking instructions of the system. The API may specify the inputs required for performing the action and may specify outputs of the action. The inputs and outputs may be represented as objects, for example, nested objects that include attributes or fields. Each field may be associated with a type (i.e., data type, for example, integer, string, boolean, and so on). The common visualization model format allows representation and visualization of API models.

The modeling concepts supported by common visualization model format may be different from modeling concepts supported by a particular API description language. The system allows model bindings to be specified for the API description language to allow mapping of modeling concepts of the API description language to the common visualization model format without loss of information. The use of model bindings allow an API model represented using the API description language to be serialized and communicated to/from a modeling system based on the common visualization model format without loss of information.

System Environment

FIG. 1A is a block diagram of a system environment for using a common visualization model format for modeling API schemas, according to one embodiment. The system environment 100 includes a computing system 120 that communicates with users via client devices 115. The computing system 120 includes a model translation module 130. The computing system 120 may include other components not shown in FIG. 1, for example, other types of data stores, and so on. The system environment 100 may include other elements not shown in FIG. 1A, for example, a network.

The computing system 120 allows users to specify an API model 125 using an API description language. The API model 125 may be specified using a user interface, for example, a user interface of development environment that is based on a particular API description language. The development environment may include a user interface that allows users to specify the API model. The user interface may be displayed via a display of a client device 115, e.g., client device 115A. The system allows the API model to be specified using different API description languages. For example, the same API may be represented as API model 125A using API description language L1, as API model 125B using API description language L2, and as API model 125C using API description language L3.

The model translation module 130 allows the user to translate the API model 125 based on the API format of the API description language to an API model 135 specified using a common visualization model format. The common visualization model format allows a model to be represented using a set of commonly used modeling constructs. For example, the common visualization model format allows a model to be represented using constructs such as a model, a resource, an operation, an argument, and so on.

The computing system 120 allows an API model 135 specified using the common visualization model format to be visualized using a user interface displayed via a client device 115, e.g., client device 115B. The user interface used to display the API model 135 specified using the common visualization model format to be modified. For example, the user may add some elements, delete some elements, or modify some elements of the API model.

The computing system 120 allows a representation of an API model 135 using the common visualization model format to be translated to a representation of the API model 125 using any of the API description languages, for example, the representations of API models 125A, 125B, 125C, and so on. This allows the computing system 120 to translate an API model 125 across multiple API description languages. Furthermore, the computing system 120 allows visualization of models specified using different API description languages, even though the different API description languages have different features and constructs.

Following is a snippet of an API model specified using an API description language RAML (RESTful API Modeling Language). The API model specifies operations, for example, Find operation. The specification of an operation includes inputs and outputs. For each input/output, the specification includes type, name, and other fields.

```
entryPoint:
    uuid: uuid11
    name: testAPI
    operations:
    -
        uuid: uuid12
        name: Find Resource /shoppingCarts
        transition:
            uuid: uuid2
            target: URL1
        inputs:
        -
            scalarRange:
                type: integer
            allowMultiple: false
            uuid: uuid13
            name: limit
            required: true
        -
            scalarRange:
                type: integer
            allowMultiple: false
            uuid: uuid14
            name: offset
            required: true
        output:
            allowMultiple: true
            uuid: uuid15
```

```
-continued required: false
            objectRange: URL2
            isMutation: false
            type: custom
```

Similarly, following is a snippet of an API model showing a data model that may be used by APIs. The specification describes entities including an entity MonetaryAmount and an entity CheckLineItem. Each entity includes attributes and fields describing the attributes.

```
name: orders.raml
entities:
    MonetaryAmount:
        uuid: uuid21
        attributes:
            currency:
                allowMultiple: false
                uuid: uuid22
                required: true
                range:
                    type: string
            amont:
                allowMultiple: false
                uuid: uuid23
                required: true
                range:
                    type: float
        associations: { }
    CheckLineItem:
        uuid: uuid24
        attributes:
            variantId:
                allowMultiple: false
                uuid: uuid25
                required: true
                range:
                    type: string
            quantity:
                allowMultiple: false
                uuid: uuid26
                required: true
                range:
                    type: float
        associations: { }
```

These example specifications are provided for illustration and are not meant to be limiting in any way.

Figure 1B:
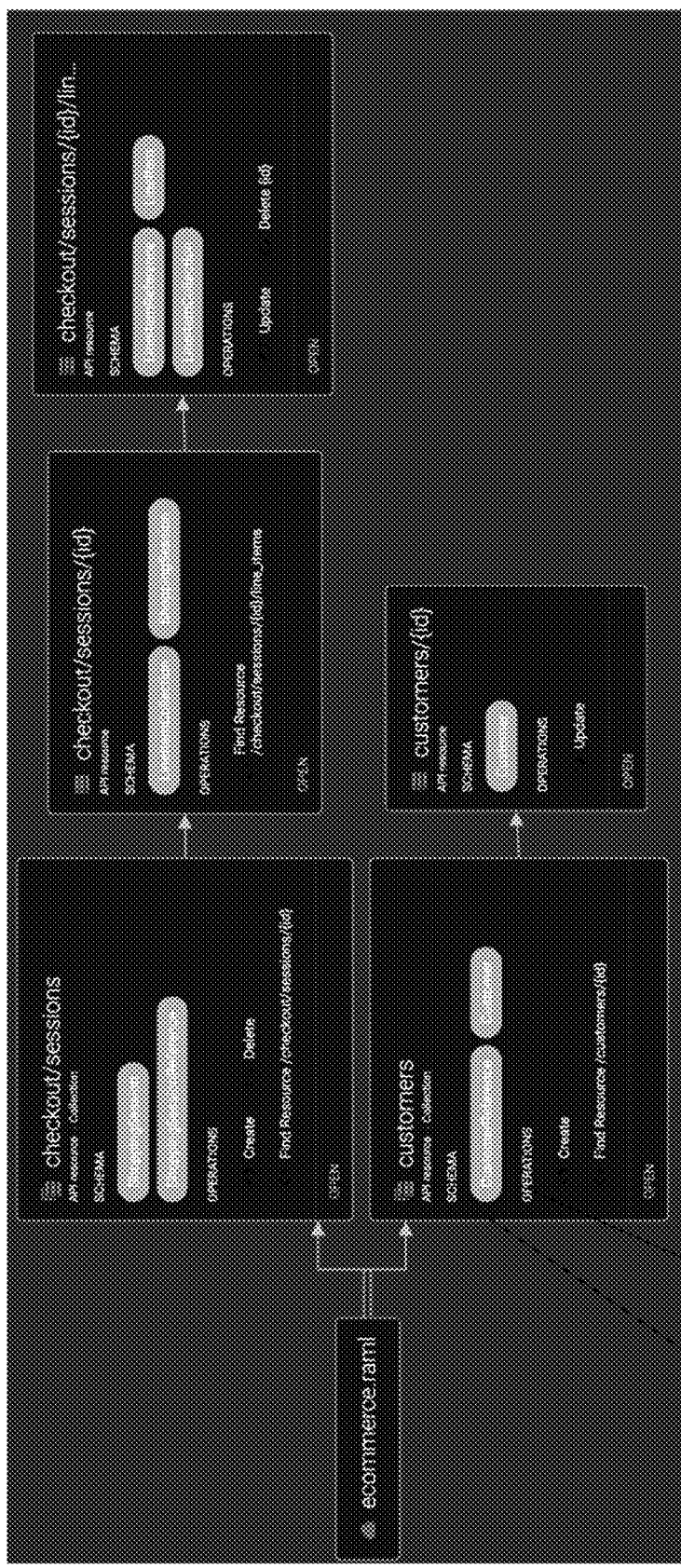
FIG. 1B shows a screen shot of an API visualized using the computing system, according to an embodiment.

FIG. 1B shows a screen shot of an API visualized using the computing system, according to an embodiment. The API description includes various resources and operations for each resource. For example, the resource 155 customer includes operations 165 create and find. The same API may be translated to a different API description language based on a different format. The translated API using the different API description language may be visualized using the computing system 120 and the visualization may be different from the visualization shown in FIG. 1B.

The computing system 120 stores model bindings between the common visualization model format and each of the API description languages. The model bindings capture the unique features of each API description language as well as maps constructs from the common model language to constructs in each API description language. The use of model bindings allows the model translation module 130 to perform translations across API description languages without losing any information in spite of differences between the constructs of the API description languages.

The computing system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The computing system 120 may interact with the client devices 115 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
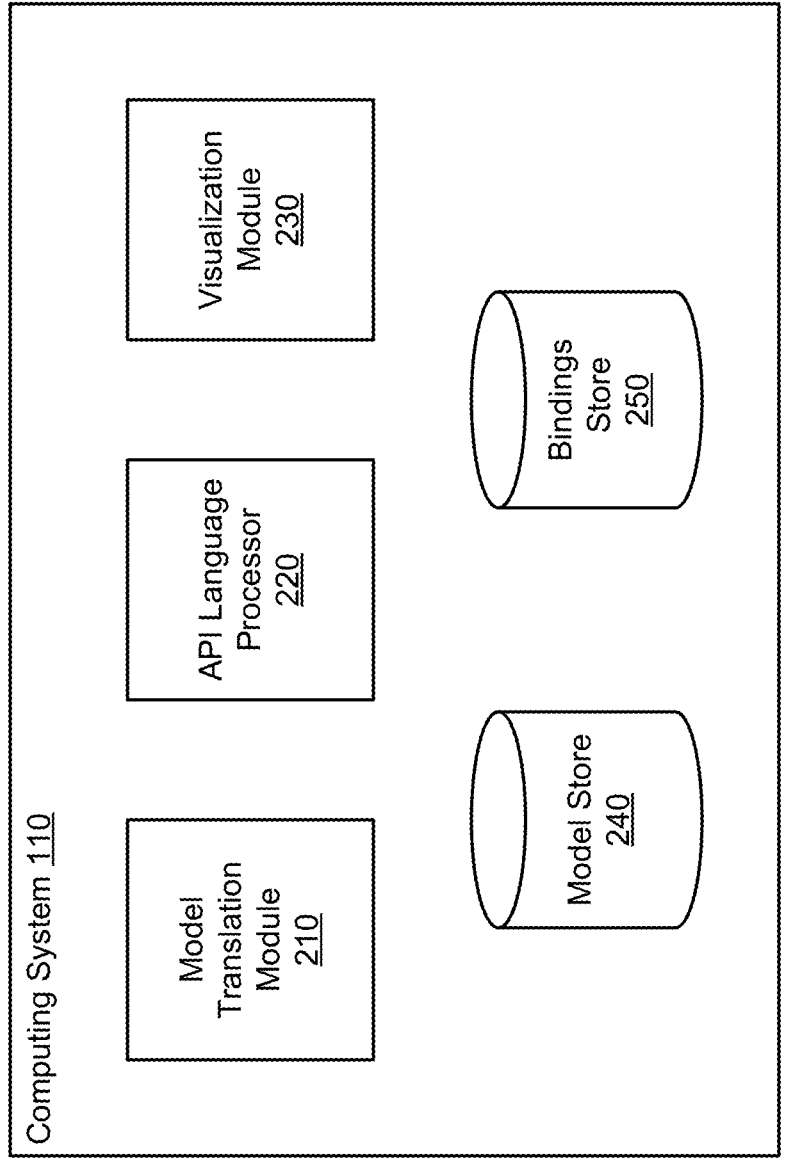
FIG. 2 is a block diagram illustrating components of the computing system for using a common visualization model format for representing and visualizing API models, according to one embodiment.

FIG. 2 is a block diagram illustrating components of the computing system for using a common visualization model format for representing and visualizing API models, according to one embodiment. The computing system 120 includes a model translation module 210, an API language processor 220, a visualization module 230, a model store 240, and a binding store. Other embodiments can have different and/or other components than the ones described here. Furthermore, the functionalities described herein can be distributed among the components in a different manner.

The model store 240 stores various API models that are processed by the computing system 120. The API models may be represented using the common visualization model format or using any of a plurality of API description languages. The API models stored in the model store 240 are processed by the remaining modules of the computing system 110, for example, the visualization module 230, the API language processor 220, or the model translation module 210.

The API language processor 220 processes various types of API description languages. The API language processor 220 parses an API model represented using a particular API description language and generates a representation for further processing, for example, for providing to the model translation module 210 for translating to common visualization model format. In an embodiment, the API language processor 220 includes instructions for parsing the syntax of each API description language. Examples of API description languages supported by the API language processor 220 include RAML, OAS (OpenAPI Specification), GraphQL, gRPC (remote procedure call), and so on.

The model translation module 210 translates an API model represented using a particular API description language to the common visualization format and also translated a model represented using the common visualization format to any particular API description language. Accordingly, the model translation module 210 can be invoked to translate an API model from an API description language L1 to an API description language L2 by translating the API model to the common visualization format in the process.

The visualization module 230 includes instructions for visualizing API models stored in the model store 240 using common visualization model format. In an embodiment, the visualization module 230 configures a user interface visualizing an API model and sends it for display via the display of a client device 115.

The bindings store 250 stores model bindings from API description languages to the common visualization format. The bindings map the constructs of the API description language to constructs of the common visualization format. The bindings store 250 may store a set of model bindings from each API description languages to the common visualization format. The set of model bindings includes mappings from constructs of the API description language to constructs of the common visualization model format. For example, the common visualization model format may include a constructs operation that is mapped to a construct method of the API description language L1 according to the set of model bindings S1 of the API description language L1. The construct operation may be mapped to a different construct of another API description language L2. For example, the construct operation may be mapped to afield construct of the API description language L2. Accordingly, each API description language may map a construct of the common visualization model format to a construct specific to the API description language. The use of model bindings allows translation from an API model of an API description language to an API model specified using the common visualization model format without loss of information. Translating the API model to a representation using the common visualization model format allows the system to visualize the API model and also allow users to modify the API model if necessary.

In some embodiments, two API description languages map the construct of the common visualization model format to an identical construct if there is an overlap of functionality between the two API description languages. In these embodiments, the system allows translation from an API model of one API description language to an API model specified using another API description language without loss of information by using the common visualization model format as an intermediate representation that may be used to visualize the API model and allow users to modify the API model if necessary.

Figure 3:
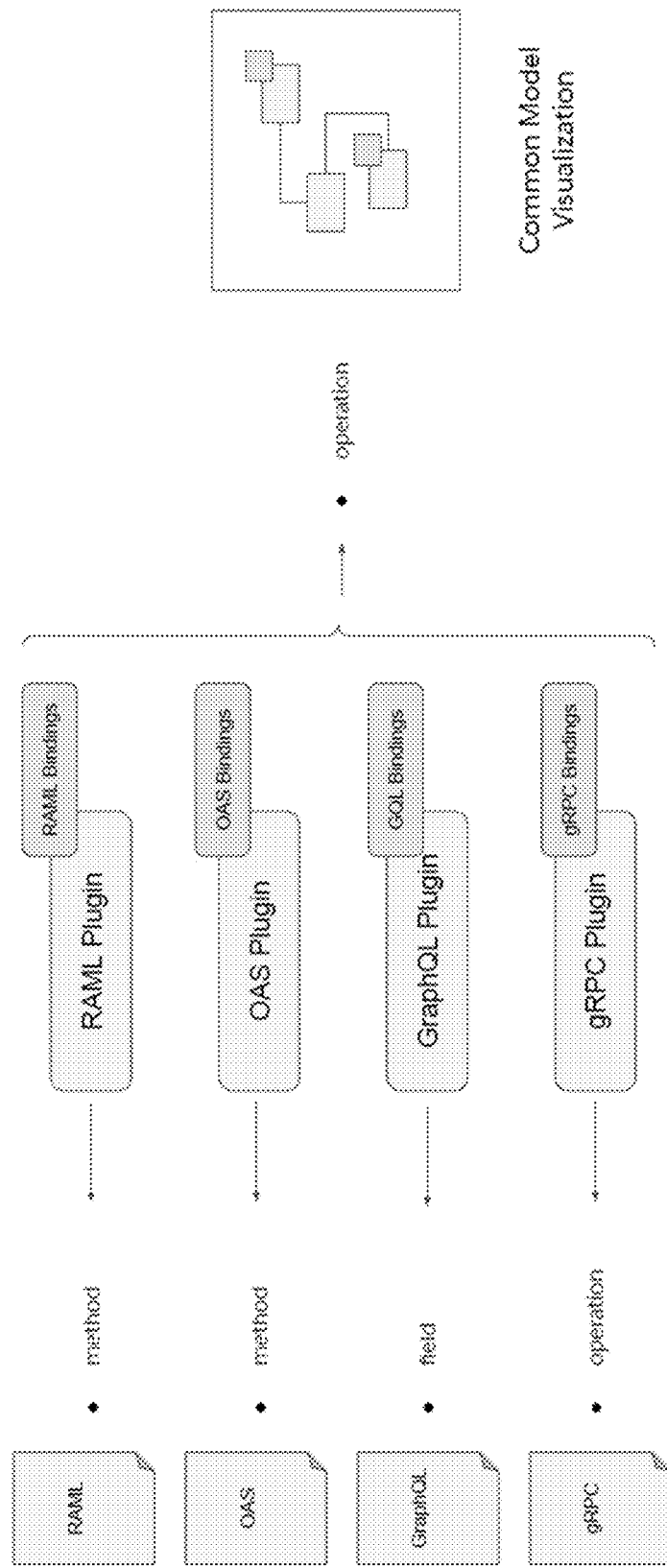
FIG. 3 is a block diagram illustrating use of model bindings to map API description languages to common visualization model format, according to one embodiment.

FIG. 3 is a block diagram illustrating use of model bindings to map API description languages to common visualization model format, according to one embodiment. An example construct operation of common visualization model format is mapped to corresponding constructs in various API description languages. For example, corresponding to "operation" construct in common visualization model format, the RAML API description language has a method construct, the OAS API description language has a method construct, the GraphQL API description language has a field construct, and the gRPC API description language has an operation construct. The bindings store 250 stores plugins for each API description language. Accordingly, the bindings store 250 includes an RAML plugin including RAML bindings for RAIL API description language, an OAS plugin including OAS bindings for OAS API description language, a GraphQL plugin including GraphQL bindings for GraphQL API description language, a gRPC plugin including gRPC bindings for gRPC API description language, and so on.

The set of bindings may include a binding that maps a construct of the common visualization model format to a construct of the API description language and specifies information including: a name for the construct as specified in the API description language, a type associated with the construct, a label with description, display information, and so on.

If a binding includes display information, for example, a particular shape for displaying the construct or a color for the display of the construct. Accordingly, the system uses the display information specified in the binding when displaying instances of the construct of an API model specified using the API description language when translated to the common visualization model format. If the binding does not include a display information when mapping a construct of the API description language to a construct of the common visualization model format, the system uses the display information specified in the construct of the common visualization model format when displaying an API model of the API description language translated to the common visualization model format.

In some embodiments, the bindings specify fields of a construct of the API description language that are not present in the fields of the corresponding construct of the common visualization model format. Accordingly, the bindings add some fields to the construct of the common visualization model format. The bindings specify types of the additional fields. If the bindings include display information specifying how to display the added fields, the system uses the display information of the bindings to visualize an API model translated from the API description language to the common visualization model format that includes an instance of the construct with added fields. If the bindings do not include display information for the added fields, the system may use default display information, for example, a default based on the type of the field added or a default specific to the construct for all fields added or a global default display information for all fields added.

Overall Process

FIG. 4 is a flow chart illustrating the overall process 400 of translating across API description languages using a common visualization model format, according to an embodiment. Other embodiments can perform the steps of these flowcharts in different orders. Other embodiments can include different and/or additional steps than the ones described herein.

The system stores model bindings from a common visualization model format to a plurality of API description languages. Accordingly, the system stores 410 a set of model bindings between the common visualization model format and an API description language. The set of model bindings maps a construct $C_1$ of the API description language to a modeling construct $C_m$ of the common visualization model format.

The system receives 420 an API model $M_1$ specified using the API description language. The API model $M_1$ includes an instance of the construct $C_1$. The system converts 430 the API model $M_1$ based on the set of model bindings to a representation based on the common visualization model format. The step of converting 430 maps the instance of the construct $C_1$ to an instance $C_m$ of the modeling construct according to the set of model bindings.

The system further receives 440 a modification to the API model. For example, the system may configure a user interface based on the API model $C_m$ and display via a user interface. The user interface allows users to modify the API model $C_m$ to an API model $C'_m$, for example, by changing a type of a fields.

The system converts 450 the modified API model $C'_m$ based on the set of model bindings, from the common visualization model format to a second representation based on the API description language. The converting 450 of the modified API model maps, the instance of the modeling construct to an instance of the first construct in the second representation according to the set of model bindings.

Accordingly, using the set of model bindings the system is able to translate between an API model represented using an API description language and an API model represented using the common visualization model format without any loss of information.

In some embodiments, the system can use the process shown in FIG. 4 to translate the API model from an API description language L1 to another API description language L2. For example, the step 450 may translate the API model represented using the common visualization model format to an API model represented using a different API description language, for example, L2. Accordingly, the system allows translation across API description languages by generating an intermediate representation based on the common visualization model format.

According to an embodiment, the system creates an in-memory graph representation of the API model specified using the API description language. The system performs a traversal of the in-memory graph, for example, a recursive traversal to generate the API model representation based on the common visualization model format.

In an embodiment, the system uses binding templates to translate an API model across an API description language and the common visualization model format. The system applies a set of binding template while performing a recursive traversal of the in-memory graph representation. A binding template is a set of instructions executed to translate a construct from a representation using a source format to a representation using a target format. The system uses the type of the construct being traversed to select a binding template to be applied to the construct. The system stores a reference to a binding template used for translating a construct to ensure a correct translation in the reverse direction, i.e. while translating from the target to the source format.

Embodiments support bindings that bridge gaps between formats used for representing API models. The system parses an API model based on a source format (e.g., a format of an API description language) and maps that to target format (e.g., the common visualization model format) based on the set of bindings. The system further allows translation in the opposite direction, i.e., from the target format to the source format and performs serialization appropriately without loss of information.

Computer Architecture

Figure 5:
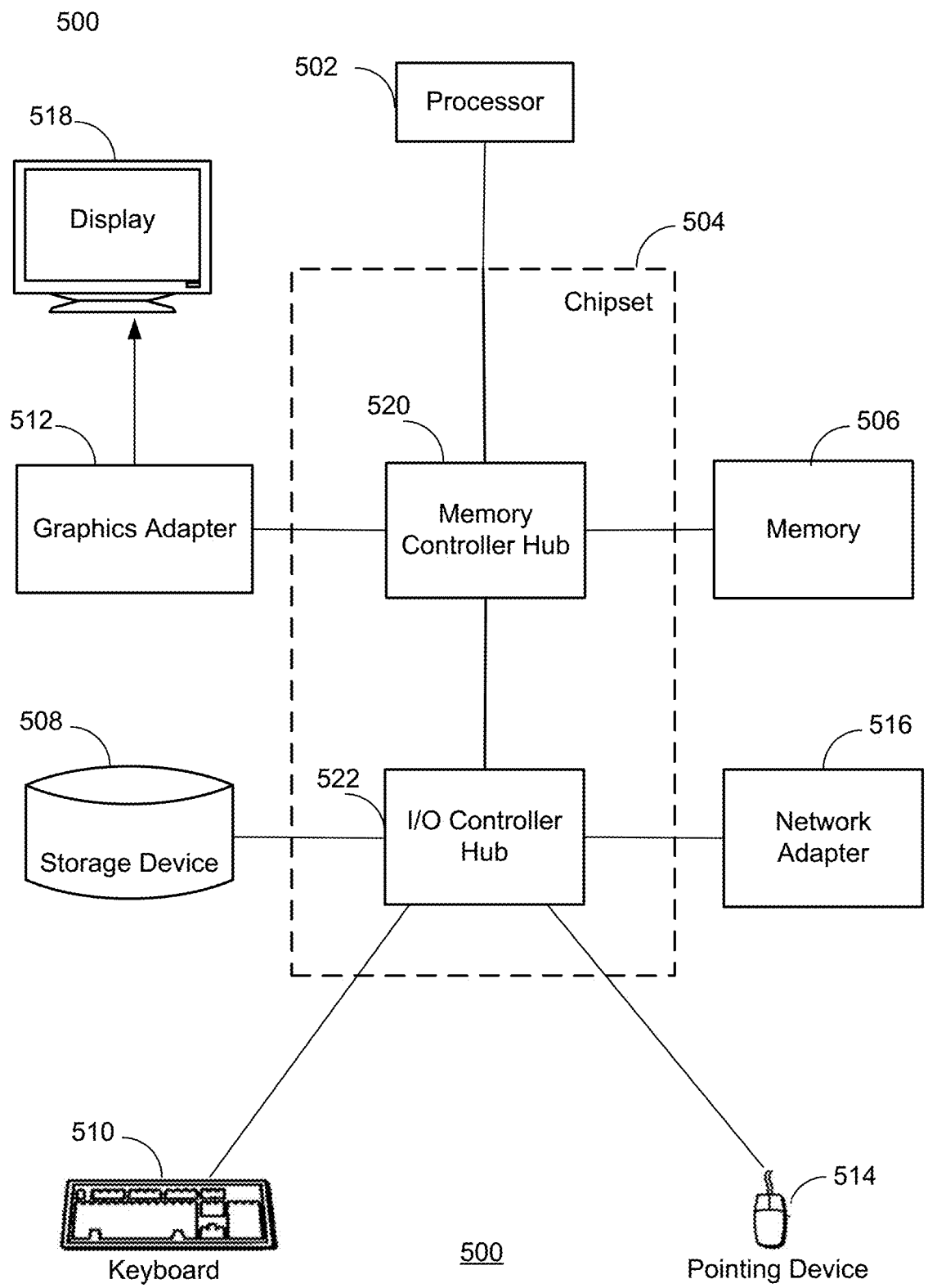
FIG. 5 is a block diagram illustrating a functional view of a typical computer system according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a network.

As is known in the art, a computer 500 can have different and/or other components than those shown in FIG. 5. In addition, the computer 500 can lack certain illustrated components. For example, a computer system 500 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 115 may be a mobile phone with limited processing power, a small display 518, and may lack a pointing device 514. The computing system 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for modeling using application programming interface (API) description languages, the computer-implemented method comprising:

storing model bindings from a common visualization model format to a plurality of API description languages, comprising, a set of model bindings between the common visualization model format and an API description language, the set of model bindings mapping a first construct of the API description language to a modeling construct of the common visualization model format and including display information that specifies how the API description language should be displayed using the common visualization model format;

receiving an API model specified using the API description language, the API model using a first instance of the first construct;

converting based on the set of model bindings, the API model to a representation in the common visualization model format, the converting mapping according to the set of model bindings, the first instance of the first construct to an instance of the modeling construct;

displaying, via a user interface, a visualization of the API model using the representation of the common visualization model format to a user according to the display information included in the set of model bindings;

receiving a modification to the API model via the user interface to obtain a modified API model;

converting based on the set of model bindings, the modified API model from the common visualization model format to a second representation based on the API description language, the converting of the modified API model mapping according to the set of model bindings, the instance of the modeling construct to a second instance of the first construct in the second representation; and wherein the set of model bindings fails to specify a portion of visualization information for the first instance of the first construct, wherein the visualization of the API model configures a visual representation of the API model that displays the first instance of the first construct according to default visualization information of the common visualization model format.

2. The computer-implemented method of claim 1, wherein the set of model bindings is a first set of model bindings, the API description language is a first API description language, the computer-implemented method further comprising:

storing a second set of model bindings between the common visualization model format and a second API description language, the second set of model bindings mapping a second construct of the second API description language to the modeling construct of the common visualization model format; and converting based on the second set of model bindings, the modified API model from the common visualization model format to a third representation based on the second API description language, the converting of the modified API model from the common visualization model format to the third representation, mapping according to the second set of model bindings, the instance of the modeling construct to an instance of the second construct in the third representation.

3. The computer-implemented method of claim 1, wherein the set of model bindings specifies visualization information for the first instance of the first construct, wherein the visualization of the API model configures the visual representation of the API model that displays the first instance of the first construct according to the visualization information specified in the set of model bindings.

4. The computer-implemented method of claim 1, wherein the API description language is one of:
a database query language,
a graph query language,
an object-oriented modeling language, or
a restful API modeling language.

5. The computer-implemented method of claim 1, further comprising:

creating an in-memory graph representation of the API model specified using the API description language; and performing a traversal of the in-memory graph representation to generate the API model representation based on the common visualization model format.

6. A non-transitory computer readable storage medium storing instructions that when executed by one or more computer processors cause the one or more computer processors to execute the instructions for performing steps comprising:

storing model bindings from a common visualization model format to a plurality of application programming interface (API) description languages, comprising, a set of model bindings between the common visualization model format and an API description language, the set of model bindings mapping a first construct of the API description language to a modeling construct of the common visualization model format and including display information that specifies how the API description language should be displayed using the common visualization model format;

receiving an API model specified using the API description language, the API model using an instance of the first construct;

converting based on the set of model bindings, the API model to a representation in the common visualization model format, the converting mapping according to the set of model bindings, the instance of the first construct to an instance of the modeling construct;

displaying, via a user interface, a visualization of the API model using the representation of the common visualization model format to a user according to the display information included in the set of model bindings;

receiving a modification to the API model via the user interface to obtain a modified API model;

converting based on the set of model bindings, the modified API model from the common visualization model format to a second representation based on the API description language, the converting of the modified API model mapping according to the set of model bindings, the instance of the modeling construct to a second instance of the first construct in the second representation; and wherein the set of model bindings fails to specify a portion of visualization information for a first instance of the first construct, wherein the visualization of the API model configures a visual representation of the API model that displays the first instance of the first construct according to default visualization information of the common visualization model format.

7. The non-transitory computer readable storage medium of claim 6, wherein the set of model bindings is a first set of model bindings, the API description language is a first API description language, the instructions further causing the one or more computer processors to perform steps comprising:

storing a second set of model bindings between the common visualization model format and a second API description language, the second set of model bindings mapping a second construct of the second API description language to the modeling construct of the common visualization model format; and converting based on the second set of model bindings, the modified API model from the common visualization model format to a third representation based on the second API description language, the converting of the modified API model from the common visualization model format to the third representation, mapping according to the second set of model bindings, the instance of the modeling construct to an instance of the second construct in the third representation.

8. The non-transitory computer readable storage medium of claim 6, wherein the set of model bindings specifies visualization information for the first instance of the first construct, wherein the visualization of the API model configures the visual representation of the API model that displays the first instance of the first construct according to the visualization information specified in the set of model bindings.

9. The non-transitory computer readable storage medium of claim 6, wherein the API description language is one of: a database query language, a graph query language, an object-oriented modeling language, or a restful API modeling language.

10. The non-transitory computer readable storage medium of claim 6, the instructions further causing the one or more computer processors to perform steps comprising:
creating an in-memory graph representation of the API model specified using the API description language; and
performing a traversal of the in-memory graph to generate the API model representation based on the common visualization model format.

11. A computer system comprising:
a computer processor; and a non-transitory computer readable storage medium storing instructions that when executed by one or more computer processors cause the one or more computer processors to execute the instructions for performing steps comprising:
storing model bindings from a common visualization model format to a plurality of application programming interface (API) description languages, comprising, a set of model bindings between the common visualization model format and an API description language, the set of model bindings mapping a first construct of the API description language to a modeling construct of the common visualization model format and including display information that specifies how the API description language should be displayed using the common visualization model format;
receiving an API model specified using the API description language, the API model using an instance of the first construct;
converting based on the set of model bindings, the API model to a representation in the common visualization model format, the converting mapping according to the set of model bindings, the instance of the first construct to an instance of the modeling construct;
displaying, via a user interface, a visualization of the API model using the representation of the common visualization model format to a user according to the display information included in the set of model bindings;
receiving a modification to the API model via the user interface to obtain a modified API model;
converting based on the set of model bindings, the modified API model from the common visualization model format to a second representation based on the API description language, the converting of the modified API model mapping according to the set of model bindings, the instance of the modeling construct to a second instance of the first construct in the second representation; and
wherein the set of model bindings fails to specify a portion of visualization information for a first instance of the first construct, wherein the visualization of the API model configures a visual representation of the API model that displays the first instance of the first construct according to default visualization information of the common visualization model format.

12. The computer system of claim 11, wherein the set of model bindings is a first set of model bindings, the API description language is a first API description language, the instructions further causing the one or more computer processors to perform steps comprising:
storing a second set of model bindings between the common visualization model format and a second API description language, the second set of model bindings mapping a second construct of the second API description language to the modeling construct of the common visualization model format; and
converting based on the second set of model bindings, the modified API model from the common visualization model format to a third representation based on the second API description language, the converting of the modified API model from the common visualization model format to the third representation, mapping according to the second set of model bindings, the instance of the modeling construct to an instance of the second construct in the third representation.

13. The computer system of claim 11, wherein the set of model bindings specifies visualization information for the first instance of the first construct, wherein the visualization of the API model configures the visual representation of the API model that displays the first instance of the first construct according to the visualization information specified in the set of model bindings.

14. The computer system of claim 11, the instructions further causing the one or more computer processors to perform steps comprising:
creating an in-memory graph representation of the API model specified using the API description language; and
performing a traversal of the in-memory graph representation to generate the API model representation based on the common visualization model format.

* * * * *